United States Patent [19]

Iwata et al.

[11] Patent Number: 5,008,767
[45] Date of Patent: Apr. 16, 1991

[54] FLYING-TYPE COMPOSITE MAGNETIC HEAD HAVING MAGNETIC CORE WITH IMPROVED FLATNESS OF AIR-BEARING SURFACE

[75] Inventors: Hitoshi Iwata, Kumagaya; Kazumi Noguchi, Kamikawa; Toshikazu Nishiyama, Fukaya; Tadashi Shinohara, Chiyoda, all of Japan

[73] Assignee: Hitachi Metals, Ltd., Tokyo, Japan

[21] Appl. No.: 299,536

[22] Filed: Jan. 23, 1989

[30] Foreign Application Priority Data

Jan. 22, 1988 [JP] Japan ................................. 63-12343

[51] Int. Cl.$^5$ ............................................. G11B 5/60
[52] U.S. Cl. .................................... 360/103; 360/122; 360/126
[58] Field of Search ................. 360/103, 104, 122, 126

[56] References Cited

U.S. PATENT DOCUMENTS 4,870,521  9/1989  Okabayashi ...................... 360/103

Primary Examiner—Robert S. Tupper

[57] ABSTRACT

A flying-type composite magnetic head includes a slider made of a non-magnetic ceramic and having side rails extending longitudinally on both lateral sides of the head; a slit extending longitudinally in one of the side rails; and a magnetic core constituted by a pair of core pieces bonded to each other with a first glass and fixed in the slit with a second glass on both sides of the core. At least one of the opposing surfaces of the core pieces is formed with an Fe-Al-Si thin layer and the opposing surfaces of the core pieces constitute a magnetic gap of the magnetic core. Gaps formed on both sides of the magnetic core in a region exposed to an air-bearing surface of the head are filled with the second glass to improve the flatness of the air-bearing surface of the head.

24 Claims, 11 Drawing Sheets

FIG. I
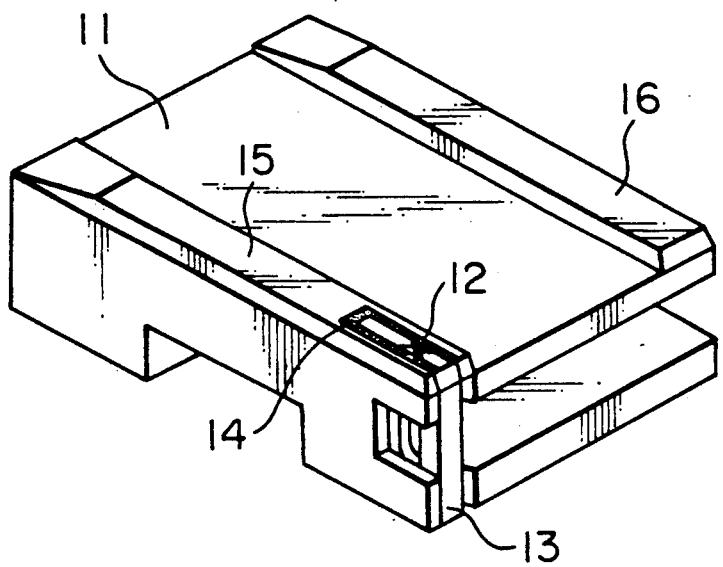
FIG. 2
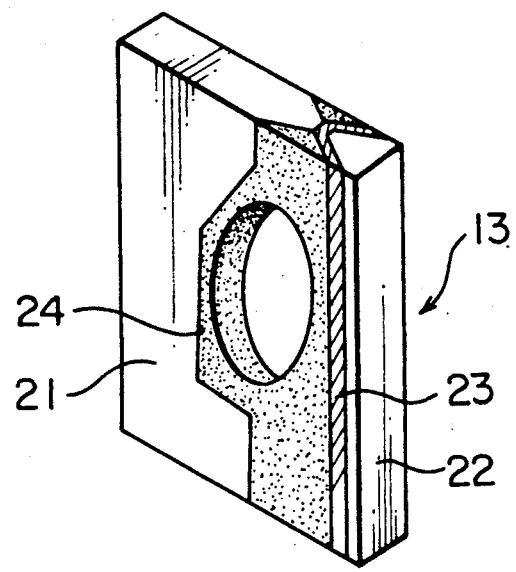

(X 40,000)

FLYING-TYPE COMPOSITE MAGNETIC HEAD HAVING MAGNETIC CORE WITH IMPROVED FLATNESS OF AIR-BEARING SURFACE

BACKGROUND OF THE INVENTION

The present invention relates to a flying-type composite magnetic head for use in a magnetic disk drive in such a manner that it is slightly floating over a magnetic recording medium, and more particularly to a flying-type composite magnetic head having not only excellent recording-reproduction characteristics but also good flatness in its air-bearing surface.

As magnetic heads used for writing and reading information in magnetic disk apparatuses, flying magnetic heads as shown in U.S. Pat. No. 3,823,416 and Japanese Patent Publication No. 57-569 are widely used. Such a flying magnetic head is constituted by a slider, a tail end of which is provided with a magnetic gap and the overall slider body is constituted by an oxide-type magnetic material with high permeability.

The flying-type magnetic head is in light contact with a magnetic disk by a spring force when the magnetic disk is stationary, but when the magnetic disk is rotating, a flow of air over the magnetic disk exerts an upward force to a lower surface of the slider, whereby the magnetic head floats over the magnetic disk. When the magnetic disk starts to rotate or stops, the magnetic head comes into sliding contact with the magnetic disk. The contact condition of the magnetic head with the magnetic disk when the magnetic disk is stopped will be explained in detail. First, the flow of surface air becomes gradually slow when the rotation speed of the magnetic disk is reduced. When the magnetic head loses its floating force, it collides with the disk surface and jumps up by its reaction and then falls onto the disk surface again. Such movement is repeated and the magnetic head slides on the disk to finally stop. Accordingly, the magnetic head should withstand shocks at the time of start and stop, and such characteristics are sometimes called CSS characteristics (Contact start stop characteristics).

Flying-type magnetic heads are generally constituted by ferrite which is an oxide-type magnetic material with high permeability have relatively good CSS characteristics. However, the ferrite has a small saturation magnetic flux density, so that sufficiently high recording densities cannot be achieved to recording media having high coercive forces. Specifically, even with use of a Mn-Zn ferrite having a relatively high saturation magnetic flux density Bs, its Bs is at most 5000 G or so.

It was then found that to achieve Bs of 8000 G or more, a magnetic head is desirably provided with a thin magnetic metal layer in its magnetic gap. For instance, Japanese Patent Laid-Open No. 58-14311 proposes a flying-type magnetic head composed of ferrite and provided with a magnetic metal layer with high saturation magnetic flux density only in a magnetic gap portion thereof. However, in this magnetic head, a magnetic transformation part has large inductance after provided with coil windings, so that it has low resonance frequency. This means that it is disadvantageous in recording and reproducing at high frequency. Here, the large inductance is due to the fact that the overall magnetic head is composed of a magnetic material. Accordingly, to achieve low inductance, a magnetic circuit should be made small. From this point of view, U.S. Pat. No. 3,562,444 discloses a flying-type composite magnetic head in which a magnetic core is embedded in and fixed to a non-magnetic slider, without constituting the entire magnetic head with a magnetic material.

Further, the present inventors proposed in Japanese Patent Laid-Open No. 61-199219 a flying-type magnetic head in which a magnetic core is embedded in a non-magnetic slider.

It has been found from the above that to obtain a flying-type composite magnetic head having good recording characteristics to high-coercive force recording media and small inductance, a composite magnetic core should be constituted by a Mn-Zn ferrite substrate with a high saturation magnetic flux density Bs and coated with a thin magnetic layer having high Bs in its magnetic gap portion. Such a magnetic core should then be embedded in a non-magnetic slider. An example of such magnetic heads is shown in Japanese Patent Laid-Open No. 60-154310 by the present inventors.

Further, Japanese Patent Laid-Open No. 61-199217 proposed a magnetic head in which a magnetic gap portion of a magnetic core is in an X-shape. However, this magnetic core having an X-shaped magnetic gap is disadvantageous in that it provides low reproduced output as explained below in detail. As a result of research on the cause of low reproduced output, it has been found that large strain is generated in a high Bs magnetic layer in the process of glass bonding as explained in detail below, resulting in extreme deterioration of the desired characteristics.

Belief of an internal stress generated in a high Bs magnetic layer may be achieved by reducing a thickness of the thin magnetic layer. However, in the magnetic gap structure proposed in Japanese Patent Laid-Open No. 61-199217, a track width and a layer thickness cannot be determined independently. Accordingly, to achieve a certain track width, the thin magnetic layer should inevitably have a larger thickness to some extent.

To eliminate such problems, a gap portion may have a structure in which a relatively thin, high Bs layer is provided in parallel with the gap.

However, in such a structure, undulation takes place in the frequency characteristics of reproduced output due to a so-called "pseudo-gap effect," since the boundary surface between the magnetic thin layer and the ferrite substrate is parallel with the magnetic gap. To prevent this undulation phenomena due to the pseudo-gap effect, a simple structure of a high Bs layer provided in parallel with the magnetic gap line is inappropriate. Further, because of various factors in production, the undulation has not been able to be prevented completely.

Thus, the desired characteristics of a magnetic head for use with a magnetic disk are (1) sufficient recordability to high-coercive force media, (2) low inductance, (3) high reproduced output without causing undulation due to extreme strain in a high Bs magnetic layer, and (4) excellent CSS characteristics. To meet all of these requirements, it is necessary that: (1) a magnetic core is embedded in a non-magnetic slider disclosed in Japanese Patent Laid-Open No. 60-154310, to improve CSS characteristics and to reduce inductance; (2) it has a structure in which a magnetic thin layer can be made as thin as possible to prevent extreme stress from being generated in the magnetic layer and (3); it has a magnetic gap portion without a pseudo-gap effect.

Further, to obtain a high-performance flying-type composite magnetic head, it is important to maintain a stable floating height in the course of the rotation of a magnetic disk.

While the magnetic disk is rotating the air on the surface of the magnetic disk also moves to exert an upward force to a lower surface of the slider. Accordingly, the magnetic head floats from the magnetic disk during the rotation of the magnetic disk. The distance of the magnetic head from the magnetic disk is called a floating height, and the floating height is decreasing year after year because of the increase in recording density of magnetic disk apparatuses. According to Computer Strage Industry Service (Section of Rigid Disk Drive) issued by Dataquest, 1984, pp. 2.2-6, the floating height has reached 10 microinches (0.25 μm). To keep such a submicron floating height stable during the rotation of the magnetic disk, it is necessary that an air-bearing surface of the magnetic head should have good flatness. Since the floating of the magnetic head is obtained by an air flow passing through a gap between the floating surface of the magnetic head (lower surface of the slider) and an upper surface of the recording medium, stable floating cannot be achieved without good flatness of the floating surface of the magnetic head.

In the case of a magnetic head disclosed in U.S. Pat. No. 3,823,416, since the air-bearing surface acting to cause floating is constituted by a single body made of Ni-Zn ferrite or Mn-Zn ferrite, good flatness is easily achieved. However, in the case of a composite magnetic head obtained by embedding a magnetic core in a slit of a non-magnetic slider, fixing the magnetic core with glass and then grinding and polishing its air-bearing surfaces, special attention should be paid to improve tis flatness. This is due to the fact that it is extremely difficult to grind the air-bearing surface to such an extend that the magnetic core and the bonding glass are completely in the same plane as the non-magnetic slider.

In sum, in order to obtain a flying-type composite magnetic head which (1) is capable of performing sufficient recording to a high-coercive force recording medium, (2) has low inductance, (3) high reproduced output and (4) is excellent is CSS characteristics, the first point to overcome is a so-called undulation phenomenon of reproduced output due to the pseudo-gap effect which is caused in a magnetic core having a trapezoidal magnetic gap in which each magnetic core piece has a flat tip portion with a thin magnetic layer coating. The second point to overcome is the deterioration of flatness which may be caused by grinding the air-bearing surface in which the magnetic core is embedded in a slit of the non-magnetic slider and fixed thereto.

SUMMARY OF THE INVENTION

Accordingly, an object of the present invention is to provide a flying-type composite magnetic head which has solved the above problems.

Specifically, an object of the present invention is to provide a flying-type composite magnetic head having a high Bs magnetic layer in its magnetic gap, whose air-bearing surface has good flatness and whose reproduced output is substantially free from undulation phenomenon.

As a result of intense research to solve these problems, it has been found that by constituting a magnetic core by a pair of core pieces whose opposing surfaces are in a trapezoidal shape, and by fixing the magnetic core in a slit of a non-magnetic slider with glass layers of sufficient thickness between both sides of the magnetic core and the inner surfaces of the slit, an undulation phenomenon of reproduced output can be prevented, and extremely improved flatness near the magnetic core can be achieved. This present invention is based upon these findings.

Thus, the flying-type composite magnetic head according to the present invention comprises a slider made of a non-magnetic ceramic and having side rails extending longitudinally on both lateral sides of the head; a slit extending longitudinally in one of the side rails; and a magnetic core constituted by a pair of core pieces bonded to each other with glass and fixed in the slit, characterized in that (a) opposing surfaces of the core pieces are in a trapezoidal shape, top flat portions of the opposing surfaces being parallel to each other; (b) at least one of the opposing surfaces is formed with an Fe-Al-Si thin layer; (c) a pair of the parallel top flat portions of the opposing surfaces constitute a magnetic gap of the magnetic core; and (d) the magnetic core is fixed in the slit with glass filled in the slit on both sides of the magnetic core.

BRIEF DESCRIPTION OF THE DRAWINGS

FIG. 1 is a perspective view showing a flying-type composite magnetic head according to one embodiment of the present invention;

FIG. 2 is a perspective view showing an example of a magnetic core to be assembled in the flying-type composite magnetic head shown in FIG. 1;

DETAILED DESCRIPTION OF THE PREFERRED EMBODIMENTS

Figure 3:
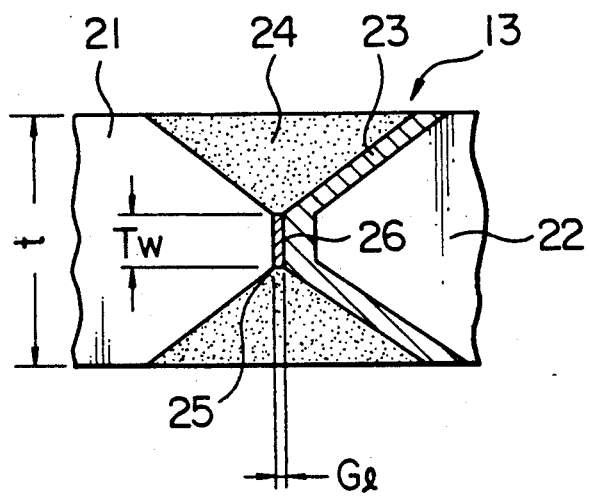
FIG. 3 is an enlarged view of the magnetic core shown in FIG. 2 in an air-bearing surface thereof.

The present invention will be explained in detail referring to the attached drawings.

FIG. 1 shows the entire structure of the flying-type composite magnetic head according to one embodiment of the present invention. The flying-type composite magnetic head comprises a non-magnetic slider 11, a slit 12 extending longitudinally in one of side rails 15, 16 of the slider 11, a magnetic core 13 embedded in the slit 12 and a glass layer 14 for fixing the magnetic core 13 in the slit 12. Since the magnetic core 13 is fixed to a tail end portion of one of the side rails 15, 16 (side rail 15 in FIG. 1) of the non-magnetic slider 11, it is important that a portion where the magnetic core is embedded and fixed has good flatness to achieve stable floating. Incidentally, the slider 11 is desirably made of a non-magnetic ceramic such as $CaTiO_3$ having a thermal expansion coefficient of $105-115 \times 10^{-7}/°C$. and a porosity of 0.5% or less.

FIG. 2 is an enlarged perspective view of the magnetic core 13. The magnetic core 13 is constituted by a C-shaped core piece 21 and an I-shaped core piece 22 both made of Mn-Zn ferrite, and an Fe-Al-Si thin layer 23 formed on the I-shaped core piece. The C-shaped core piece 21 and the I-shaped core piece 22 are bonded with each other with a first glass layer 24.

FIG. 3 is an enlarged view of the air-bearing surface of the magnetic core 13 (surface floating above the magnetic disk). In the air-bearing surface, both of the C-shaped core piece 21 and the I-shaped core piece 22 have trapezoidal opposing surfaces. In this embodiment, the I-shaped core piece 22 is formed with the Fe-Al-Si thin layer 23. In addition, a gap length-defining layer 25 made of $SiO_2$, etc. is formed in a gap between the opposing portions of the C-shaped core piece 21 and the I-shaped core piece 22, to provide a magnetic gap 26. The magnetic gap 26 has a gap length Gl and a track width Tw.

To achieve higher recording density, the gap length Gl and the track width Tw are decreasing, and at present those used for rigid disk drives have Gl of 1 μm or less and Tw of 20 μm or less. On the other hand, the magnetic core 13 has a thickness t of 0.1–0.2 mm or so. Accordingly, the thickness of the magnetic core 13 is much smaller in the magnetic gap portion than in other portions. Thus, each of triangular spaces defined by the opposing surfaces of both core pieces 21, 22 is filled with a large amount of glass. This glass layer is called a first glass layer herein to distinguish it from a glass layer for fixing the magnetic core 13 to the slit of the slider. The first glass layer is shown by a reference numeral 24 in FIG. 2.

This magnetic head can be produced by the steps schematically shown in FIGS. 4(a)–(f). First, ferrite blocks 41, 43 for producing the I-shaped core piece and the C-shaped core piece are prepared. These ferrite blocks are desirably made of Mn-Zn ferrite having high Bs and extremely high permeability at high frequency. In addition, to reduce voids which tend to appear in the glass during the process of glass bonding, the ferrite blocks are desirably given high density by means of a hot isostatic press method. Particularly preferred is Mn-Zn polycrystalline ferrite with $B_{10}=4700-5400$ G, Hc=0.1–0.2 Oe, a permeability of 800–1300 at 5 MHz, a porosity of 0.5% or less and a thermal expansion coefficient of $105-120 \times 10^{-7}/°C$. However, a single crystal ferrite can be used instead of polycrystalline ferrite.

A substrate for the I-shaped core block 41 is provided with W-shaped grooves 42 by dicing as shown in FIG. 4 (a), and a substrate for the C-shaped core block 43 is also provided with W-shaped grooves 44 as shown in FIG. 4 (b). The I-shaped core block 41 is then ground to a surface shown by a broken line X–X' and then mirror-finished to obtain a predetermined track width Tw as shown in FIG. 4(c) (Step (c)). Next, the I-shaped core block 41 having a predetermined track width Tw is provided with an Fe-Al-Si thin layer 45 by sputtering as shown in FIG. 4 (d). As sputtering conditions, 5–12 mTorr of Ar gas pressure is desirable to maintain stable discharge. To prevent the cracking of a metal target due to a temperature increase and to obtain a thin film formation speed of about 800 Å/min, electric power is desirably 600–1200 W in the case of a target of 150 mm in diameter. To achieve high permeability, the composition of the Fe-Al-Si layer is desirably 83–86% of Fe, 5–8% of Al and 8–11% of Si, by weight. To obtain a small magnetostriction constant, it is desired that Fe is 83.5–85%, Al is 5–7%, and Si is 9–10.5% by weight. To improve its corrosion resistance, the Fe-Al-Si thin layer may contain a small amount of additives. In this case, it is desired to add 2 weight % or less of Ti, Ru, Cr, etc. alone or in combination.

Figure 4A:
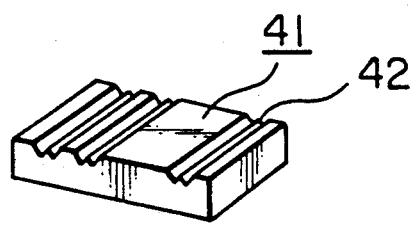
FIGS. 4(a)–(f) are views showing the steps of producing the magnetic core of FIG. 2.
Figure 4B:
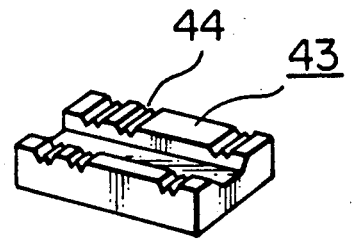
Figure 4C:
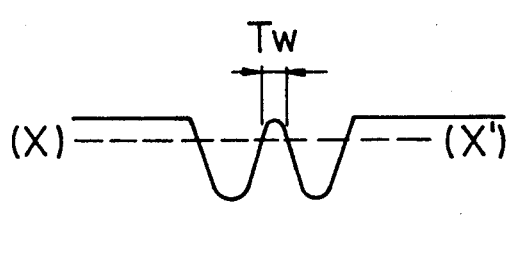
Figure 4D:
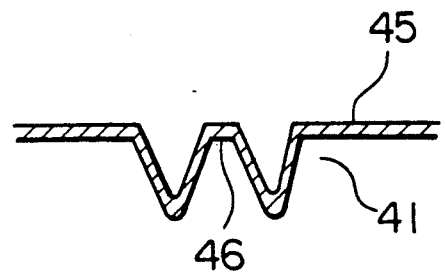
Figure 4E:
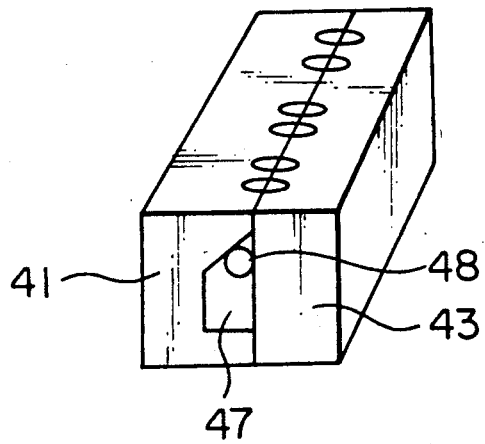
Figure 4F:
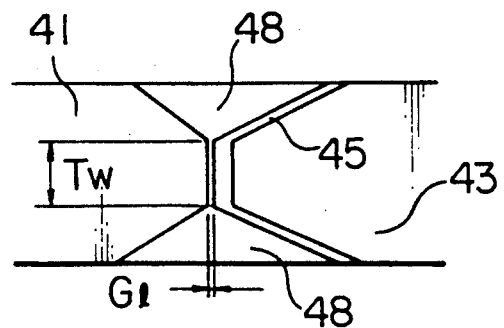

On the other hand, the C-shaped core block 43, which has no Fe-Al-Si thin layer and has W-shaped grooves 44 formed by dicing, is also ground to a predetermined track width as in step (c). After that, both blocks 41 and 43 are combined in such a manner that the track width of each core block coincides with each other. A glass rod 48 is placed in a coil-winding window 47, and the glass rod 48 is melted by heating to bond the two core blocks as shown in FIG. 4(e) (Step (e)). In this case, the preferred glass is one having a softening point of 540°–630° C. and a thermal expansion coefficient of $94-103 \times 10^{-7}/°C$. to prevent the undulation of reproduced output due to the pseudo-gap effect. The glass compositions showing such characteristics are, for instance, 54 PbO-35.9 $SiO_2$-10.1 $K_2O$ (weight %), 40.6 PbO-36.9 $SiO_2$-12.6 $B_2O_3$-9.9 $Na_2O$ (weight %), etc. The bonding with such glass is conducted at 700°–760° C. By cutting the bonded blocks, a magnetic core can be obtained. The magnetic core thus produced has an air-bearing surface with which it faces a magnetic disk, as shown in FIG. 4(f).

Figure 5:
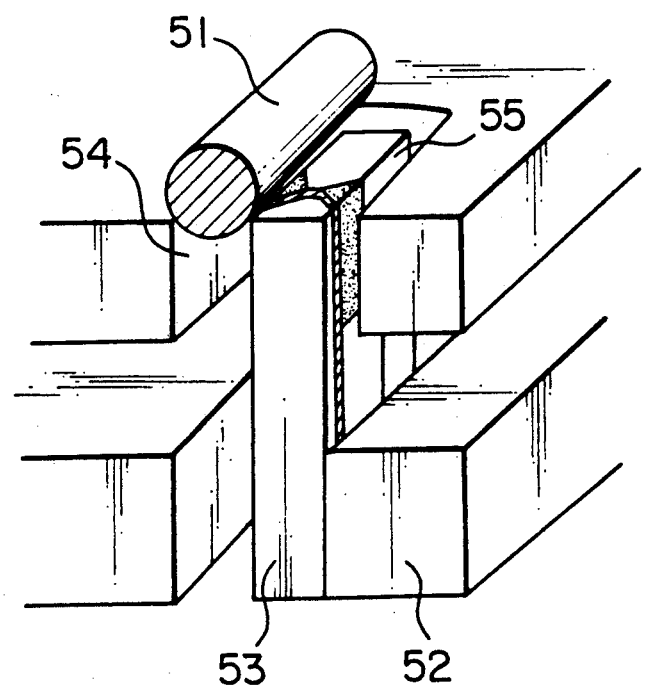
FIG. 5 is a view showing the step of filling a second glass in the production of the flying-type composite magnetic head of FIG. 1.

The bonding of this magnetic core to the slit of the slider is conducted as follows. FIG. 5 is a perspective view showing a state in which the bonded magnetic core 53 is placed in a slit of the slider 52, and a glass rod 51 is placed on the slider 52. In an upper portion of the magnetic core 53, gaps 54, 55 are provided between both sides of the magnetic core 53 and the inner surfaces of the slit of the slider 52. The provisional fixing of the core 53 in the slit is achieved easily by a spring member (not shown) forcefully inserted in a gap between one side of the magnetic core 53 and the opposing inner surface of the slit. The glass rod 51 is to constitute a second glass layer, and it preferably has a thermal expansion coefficient of $87-96 \times 10^{-7}/°C$. and a softening point of $370°-480°$ C. or so. By heating this glass rod 51 at a temperature of $500°-580°$ C., it flows into the gaps 54, 55.

Figure 6:
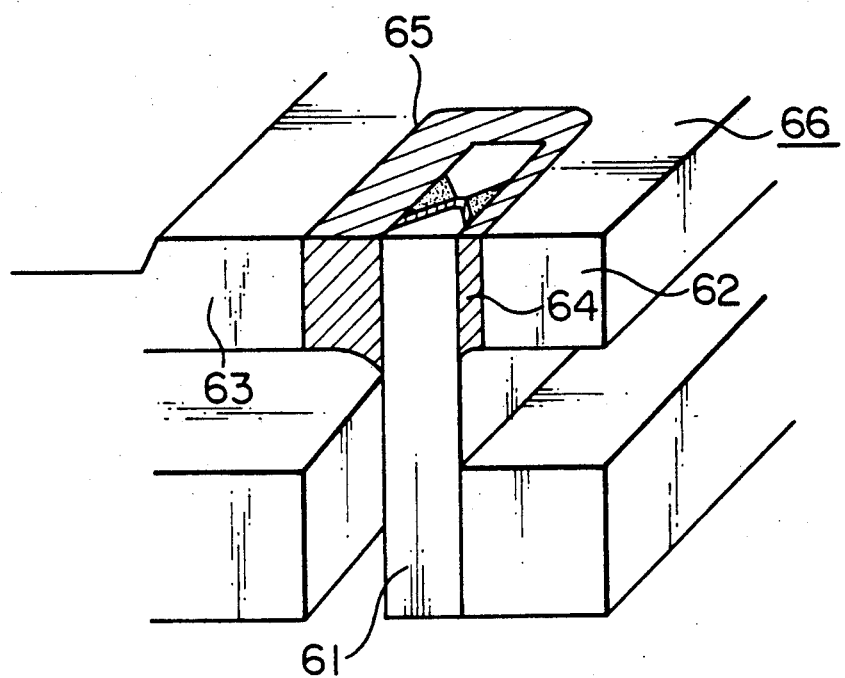
FIG. 6 is an enlarged perspective view showing an important portion of the flying-type composite magnetic head according to one embodiment of the present invention.

After the second glass flows into the gaps 54, 55 and is solidified, the air-bearing surface is ground to a state as shown in FIG. 6. In FIG. 6, the second glass fills the gaps 64, 65 between the magnetic core 61 and slider portions 62, 63 with the air-bearing surface 66 ground and mirror-finished.

As is clearly shown in FIG. 6, a gap between the magnetic core 61 and one inner surface of the slit of the slider 62 is zero in the lower portion of the magnetic core 61, namely the magnetic core 61 is in contact with one inner surface of the slit of the slider 62 in its lower portion, while it has a sufficient width in an upper portion thereof as shown by reference numeral 64. By this structure, the magnetic core 61 is precisely positioned and strongly fixed in the slit with the second glass layers 64, 65 provided on both sides of the magnetic core 61.

On the other hand, in the case of a conventional magnetic core with a high Bs layer disclosed in Japanese Patent Laid-Open No. 61-199217, high characteristics cannot be obtained as described below in detail.

Figure 7:
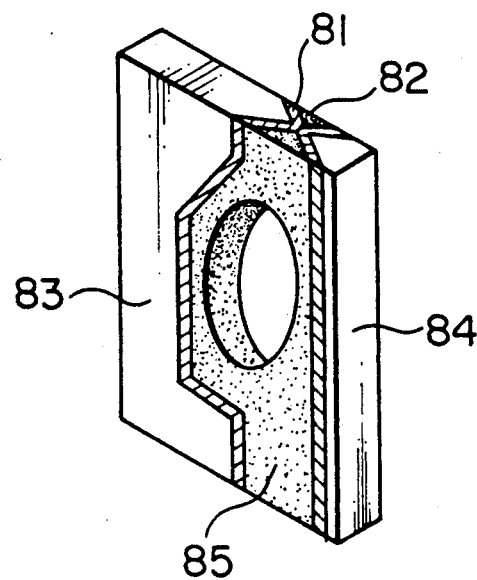
FIG. 7 is a perspective view showing a conventional magnetic core.
Figure 8:
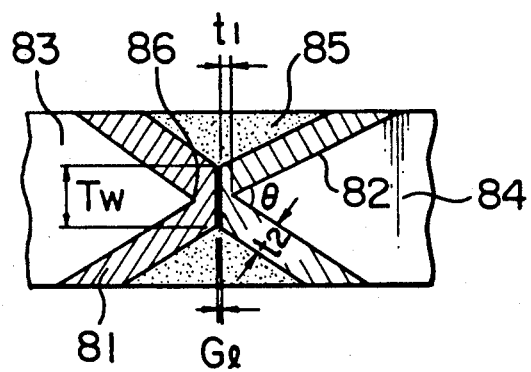
FIG. 8 is an enlarged view of an air-bearing surface of the magnetic core of FIG. 7.

First, the magnetic core of Japanese Patent Laid-Open No. 61-199217 had the following structure:

As is schematically shown in FIG. 7, it is constituted by a C-shaped core piece 83, an I-shaped core piece 84, high Bs layers 81, 82 formed on the core pieces 83, 84, and a bonding glass layer 85. The gap structure of this magnetic core is as shown in FIG. 8. In this conventional magnetic core, it should be noted that the central portions (tip portion) 86 of both Mn-Zn ferrite core pieces, each coated with an Fe-Al-Si thin layer, have sharp angles. In addition, the thicknesses $t_1$ and $t_2$ of the Fe-Al-Si layer and the track width Tw are not independent of each other, but they are closely related. That is, if $t_2$ is extremely small, the Fe-Al-Si thin layer becomes substantially zero in thickness at the sharp edge portions. Accordingly, to keep a certain level of $t_1$, the thickness $t_2$ should be sufficiently large. For instance, when Tw is 15 $\mu$m, angle $\theta$ is 60°, and $t_1$ is 5 $\mu$m, $t_2$ should be 9 $\mu$m, 2 times as large as $t_1$. Thus, the larger thickness $t_2$ leads to the deterioration of desired characteristics of the magnetic head.

As described above, the magnetic core of the present invention as shown in FIG. 3 can show high performance because of low inductance. Further, the present invention is aimed at preventing the undulation of reproduced output.

In the process of producing a magnetic head in which a magnetic core is first produced by bonding core pieces by with a first glass and then fixing it to a non-magnetic slider made of $CaTiO_3$ with a second glass as in the present invention, special attention should be paid unlike in usual magnetic heads. Specifically, in the case of fixing the magnetic core to the slider with the second glass, when both first and second glasses have too close softening points, the viscosity of the first glass is greatly reduced in the step of fixing the magnetic core, causing extreme change of the size of the gap portion, namely displacement between the Fe-Al-Si thin layer and the opposing core piece surface. This displacement is as large as 100 $\mu$m or more, which can be observed even by an optical microscope. As a result of research by the inventors, this undesirable phenomenon can be prevented when the first and second glasses have softening points differing from each other by 100° C. or more. For instance, when the first glass has a softening point of 590° C. and a thermal expansion coefficient of $97 \times 10^{-7}/°C$., and when the second glass has a softening point of 450° C. and a thermal expansion coefficient of $90 \times 10^{-7}/°C$., the above displacement can be fully prevented.

Incidentally, even though proper first and second glasses are selected, the first glass is somewhat softened in the step of fixing the magnetic core to the slider, showing a viscosity of $10^7-10^9$ poise or so. Accordingly, the first glass shows a somewhat liquid-like nature in the fixing step, making it likely that displacement of 200-300 Å or so between the Fe-Al-Si thin layer and the Mn-Zn ferrite core piece takes place by a force exerted onto the magnetic core in the fixing step. However, in the magnetic core of the present invention, substantially no displacement takes places because it uses a large amount of glass.

Next, with respect to the undulation of reproduced output due to the pseudo-gap effect, it is generally caused due to the fact that the boundary between the Fe-Al-Si thin layer and the tip portion of the Mn-Zn ferrite core piece is in parallel with the magnetic gap. In this gap structure, the undulation is caused by an extremely small deformation of the boundary. To prevent this extremely small deformation, the magnetic head should have the structure of the present invention as described in detail below.

Although there may be many combinations of $PbO$-$SiO_2$ as main components and other various elements for a first bonding glass of the magnetic core, the experiments of the inventors have revealed that a glass composition comprising $PbO$-$SiO_2$ and one or more alkali metal oxides ($K_2O$, $Li_2O$, $Na_2O$, etc.), a glass composition comprising $PbO$-$SiO_2$-$B_2O_3$ and one or more alkali metal oxides, and a glass composition comprising $PbO$-$SiO_2$-$B_2O_3$-$Al_2O_3$ and one or more alkali metal oxides are suitable. In these compositions, the preferred compositions are, by weight, 28-49% of $SiO_2$, 44-59% of PbO and 7-13% of alkali metal oxide, or 28-49% of $SiO_2$, 5-15% of $B_2O_3$, 7-13% of alkali metal oxide and the balance substantially PbO. In the latter composition, 5-12% of $Al_2O_3$ may be added. Particularly preferred examples of the first glass are, by weight, 40.6 PbO-36.9 $SiO_2$-12.6 $B_2O_3$-9.9 $Na_2O$ which has a softening point of 560° C. and a thermal expansion coefficient of $95 \times 10^{-7}/°C$., and 35 PbO-45 $SiO_2$-8 $B_2O_3$-7 $Al_2O_3$-5 $K_2O$ which has a softening point of 580° C. and a thermal expansion coefficient of $95 \times 10^{-7}/°C$. When the magnetic core pieces are bonded with this first glass, the bonding strength of the magnetic core is high as 5 kg/mm$^2$, without causing any corrosion of the Fe-Al-Si thin layer.

B$_2$O$_3$ has a function to prevent the corrosion of the glass in a highly humid condition. However, when B$_2$O$_3$ is excessive, the wettability of the Fe-Al-Si thin layer or the ferrite core by the glass decreases, resulting in insufficient bonding strength. Al$_2$O$_3$ has a function to prevent the discoloration of the glass at high temperature. However, when it is excessive, the glass has a too high softening point, making it unable to achieve easy bonding. In addition, alkali metal oxides have a function to adjust the fluidity of the glass.

In a case where the magnetic core is bonded with such bonding a first glass to the slider, a second glass used therefor should have a softening point and a thermal expansion coefficient both in desired ranges. The CaTiO$_3$ slider has a thermal expansion coefficient of 105–115×10$^{-7}$/°C., and the Mn-Zn ferrite has a thermal expansion coefficient of 105–120×10$^{-7}$/°C. Here, based on the idea disclosed in Japanese Patent Publication No. 35-8785 that "good bonding cannot be achieved without using glass whose thermal coefficient differs by only ±5% or less from that of a substrate to be bonded," good bonding cannot be obtained without using glass having a thermal expansion coefficient of 110×10$^{-7}$/°C. or more to the Mn-Zn ferrite having a thermal expansion coefficient of 115×10$^{-7}$/°C. However, according to the experiments by the inventors, it has been found that a glass having a further smaller thermal expansion coefficient is more desirable. One example of such glass is 78 PbO-8 Al$_2$O$_3$-10 SiO$_2$-4 B$_2$O$_3$ (by weight %). This glass has a thermal expansion coefficient of 91×10$^{-7}$/°C. and a softening point of 440° C. Further, the composition of 80.5 PbO-7 Al$_2$O$_3$-5.5 SiO$_2$-7 B$_2$O$_3$ (by weight) is also preferable. This glass composition has a thermal expansion coefficient of 92×10$^{-7}$/°C. and a softening point of 430° C. By conducting the fixing of the magnetic core with such glass at 530° C., fixing without cracks can be achieved. Further, as a result of detailed investigation, the preferred thermal expansion coefficient is 87–96×10$^{-7}$/°C., and as already described, to conduct the fixing at such a temperature as to avoid extreme softening of the bonding glass (first glass), namely at a temperature of 500°–580° C., the softening point of the second glass is desirably 370°–480° C. The second glass composition showing such characteristics is 70–83% of PbO, 3–10% of Al$_2$O$_3$, 6–13% of SiO$_2$ and 4–10% of B$_2$O$_3$ by weight.

The importance of flatness of the air-bearing surface (surface opposing a recording medium) of a magnetic head to which a magnetic core is fixed will be explained below.

Figure 11:
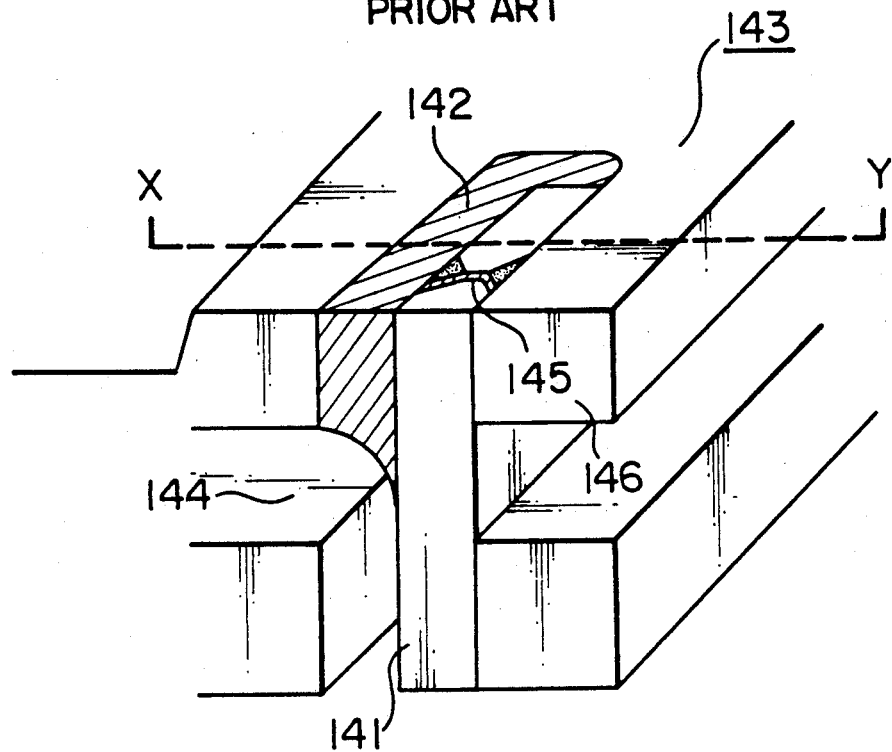
FIG. 11 is a perspective view showing an important portion of the flying-type composite magnetic head of the conventional structure.

FIG. 11 shows a magnetic core produced by fixing a magnetic core 141 with a second glass 142 by a conventional method, and then mirror-finishing its air-bearing surface 143. Reference numeral 144 denotes a slider window for winding a coil 145 denotes a magnetic gap, and 146 denotes a slider portion. Incidentally, the mirror-finishing of the air-bearing surface 143 is conducted with fine diamond grinder particles on an Sn-stationary plate. To improve the flatness of the ground surface, diamond grinder powder having a particle size of 1–0.5 μm is suitable.

Figure 12:
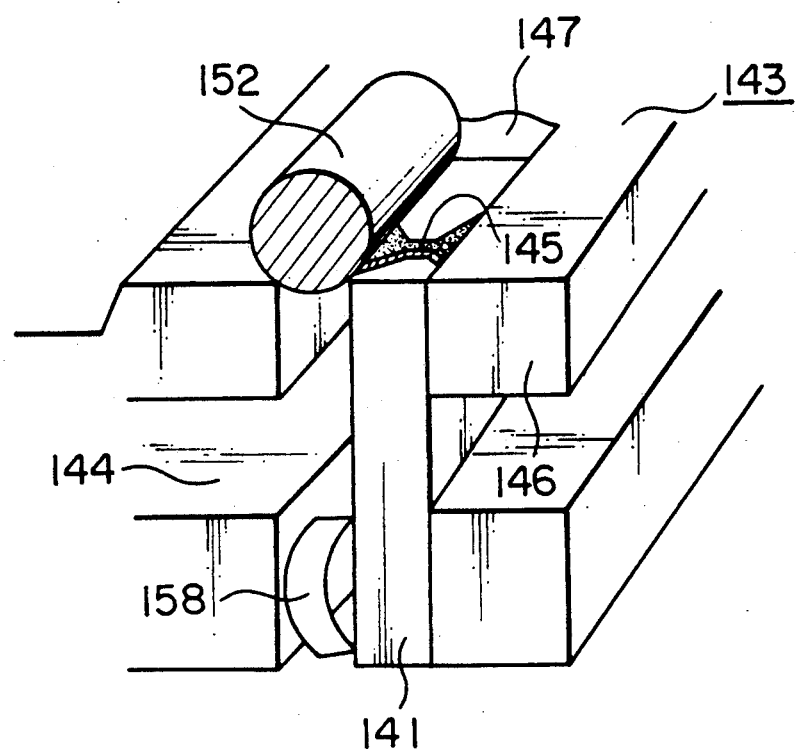
FIG. 12 is a perspective view showing the flying-type composite magnetic head of FIG. 11 in its course of production.

FIG. 12 shows the fixing of the magnetic core 141 in a slit 147 of the slider in the process of producing the magnetic head of FIG. 11. In this process, the magnetic gap 145 should be set at a predetermined position in the slit 147. Accordingly, the magnetic core 141 is pressed onto one inner surface (right inner surface in FIG. 12.) of the slit 147 of the slider with a leaf spring 158, etc. A glass rod 152 is placed on the magnetic core 141 thus provisionally fixed in the slit 147. The glass rod 152 is melted in an electric furnace to cause it to flow into the gap for fixing. After fixing, excess glass is removed, and the air-bearing surface is ground to have good flatness.

In such a conventional structure of the magnetic head, the flatness of the air-bearing surface 143 (surface opposing a magnetic medium) cannot be fully improved even with sufficient grinding. Since the magnetic core 141 is provisionally fixed in the slit 147 with the leaf spring 158 inserted between the magnetic core 141 and one inner surface (left inner surface in FIG. 12) of the slit 147, the second glass layer is formed only in a gap on one side of the magnetic core 141, leaving the other gap (on the side of slider portion 146 in FIG. 12) unfixed with the glass. In this state, the grinding is conducted. Accordingly, since the outer end portion 146 of the slider is in a shape of a cantilever, it is deformed during the grinding operation and returns to its original shape after grinding. Therefore, drastic decrease in flatness tends to appear at the boundary between the magnetic core 141 and the outer end of slider portion 146 along the line X-Y extending from the inner side to the outer side of the slider shown in FIG. 11.

On the other hand, the magnetic head of the present invention is extremely improved with respect to the flatness of a surface opposing a magnetic medium.

Figure 13:
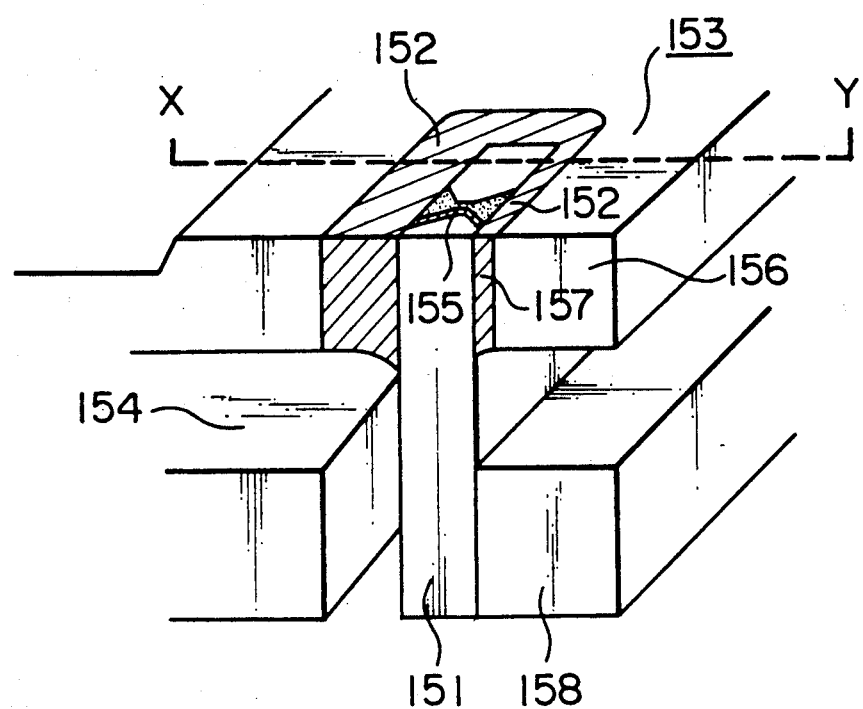
FIG. 13 is a perspective view showing an important portion of the flying-type composite magnetic head according to one embodiment of the present invention.

FIG. 13 shows one embodiment of the present invention, in which a magnetic core 151 is pressed onto one of the inner surfaces of a slit of the slider at its lower portion 158. In an upper portion 156 of the slider, the inner surface of the slit recedes slightly, providing a space 157 between one inner surface of the slit and the magnetic core 151. By placing a glass rod and heating it in an electric furnace as in FIG. 12, the glass 152 flows into the gap between the slider and the magnetic core 151. Since there is no notch corresponding to the space 157 in the lower portion 158 of the slider, there is no problem in provisional fixing of the magnetic core 151. Reference numeral 154 denotes a slider window for winding a coil and 155 denotes a magnetic gap. In a magnetic head of such structure, since there is a sufficient gap between the magnetic core 151 and inner surfaces of the slit, a second glass layer 152 of sufficient thickness can be formed in a space on each side of the magnetic core 151, so that the magnetic core 151 is accurately and strongly fixed in the slit. As a notch width, it would be sufficient if it is 2–3 μm or more, but for practical reasons, it is desirably 5 μm or more. With this structure, the flatness of the air-bearing surface 153 (surface opposing a magnetic medium) of the magnetic head is improved drastically.

Figure 14:
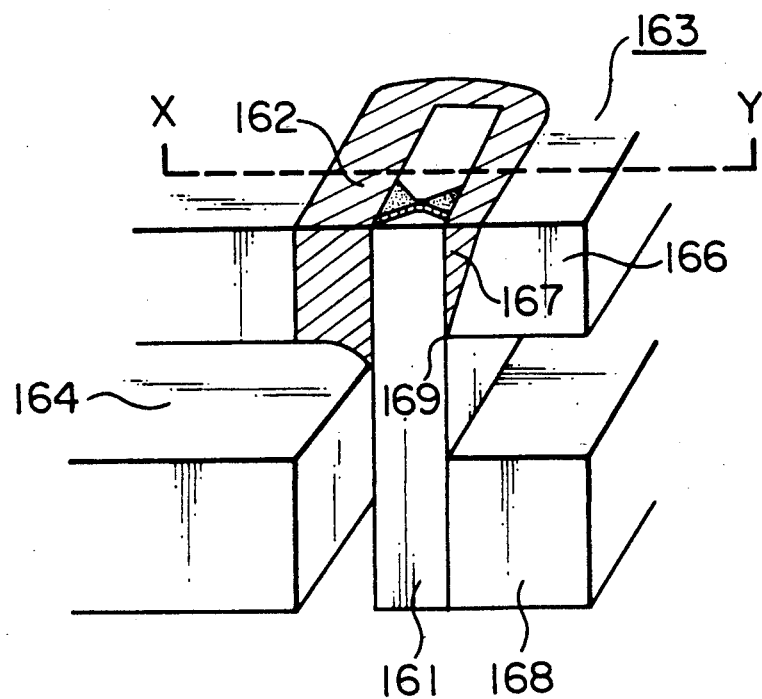
FIG. 14 is a perspective view showing an important portion of the flying-type composite magnetic head according to another embodiment of the present invention.

FIG. 14 shows a magnetic head according to another embodiment of the present invention, in which the magnetic core 161 is pressed onto an inner surface of a slit in a lower portion 168 of the slider, and a slanted notch 167 is provided in an upper end portion 166 of the slider. This notch 167 is not parallel with the magnetic core 161, and it is in contact with the magnetic core 161 at its lower end 169 and is continuously expanding upwardly. With respect to other parts, this magnetic head is substantially the same as in FIG. 13. Reference numeral 162 denotes a second glass layer, 163 an air-bearing surface, and 164 a slider window for winding a coil.

Figure 15:
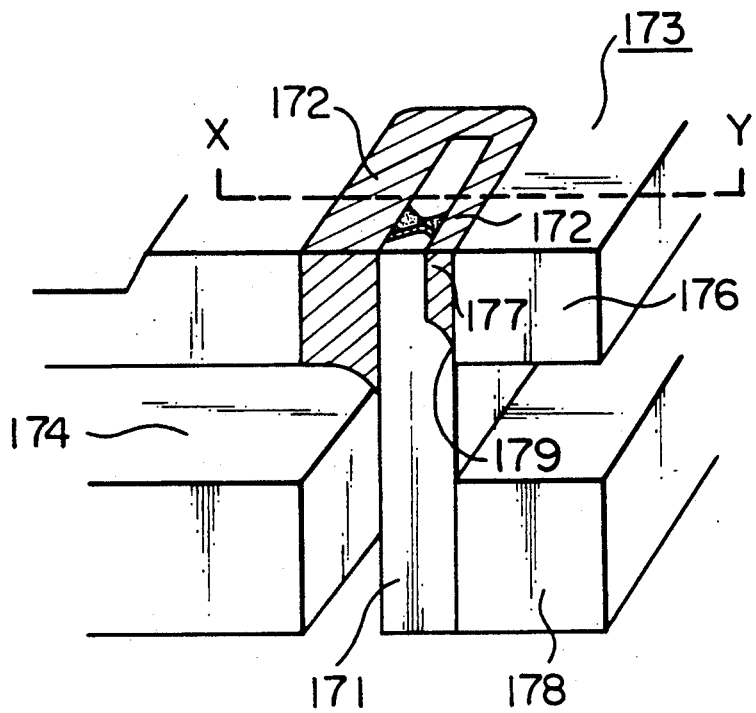
FIG. 15 is a perspective view showing an important portion of the flying-type magnetic head according to a further embodiment of the present invention.

FIG. 15 shows a magnetic head in which a slider is free from a notch, and a magnetic core 171 is provided with a notch 177 in its upper side portion. With respect to other parts, this magnetic head is substantially the same as in FIG. 11. Reference numeral 172 denotes a second glass layer, 173 an air-bearing surface, 174 a slider window for winding a coil, 176 and 178 slider portions, and 179 a lower end of the notch 177. The width of the notch 177 is appropriately as large as 5 μm or more as in the previous examples. When it is too large, it leads to the reduction of a track width Tw and increases a magnetic resistance of the magnetic core 171, which in turn leads to the decrease of reproduced output. For instance, in a case where the magnetic core 171 has a thickness of 150 μm, the notch 177 provided in an upper side portion of the magnetic core desirably has a width of 50 μm or less.

As described above in detail, by fixing the magnetic core in a slit with the second glass layer having a sufficient thickness on both sides of the magnetic core, the flatness of the air-bearing surface of the magnetic head can be improved drastically, and further the undulation phenomenon of reproduced output can be effectively prevented. The reason therefor may be considered as follows: The undulation phenomenon of reproduced output takes places when a high Bs thin layer peels off from the surface of the core piece in a magnetic gap portion, but the second glass layer having sufficient thickness can exert large pressure onto the high Bs layer and the core piece, making the peeling of the thin layer less likely. Accordingly, the flying-type composite magnetic head with good flatness and free from the undulation phenomenon of reproduced output can be obtained.

The present invention will be explained in further detail by means of the following Examples.

EXAMPLE 1

A magnetic core having a structure shown in FIG. 2 was produced by using a C-shaped core piece and an I-shaped core piece both made of Mn-Zn polycrystalline ferrite. The Mn-Zn ferrite was compressed by a hot isostatic pressing method, had a porosity of 0.1%, and it had magnetic properties in which $B_{10}=5100$ G, $Hc=0.15$ Oe and permeability at 5 MHz=950. Further, the ferrite had a thermal expansion coefficient of $115 \times 10^{-7}/°C$. The Fe-Al-Si thin layer formed on the I-shaped core piece by sputtering had a composition by weight of 84.7% Fe, 5.9% Al and 9.4% Si, and a thickness of 3 μm. This thin layer had magnetic properties in which $Bs=11,000$ G, $Hc=0.3-0.5$ Oe, permeability at 5 MHz=1,000–2,000, and magnetostriction constant=$+1 \times 10^{-6}$.

A first glass for bonding the C-shaped core piece and the I-shaped core piece had the following composition:

| | |
|---|---|
| PbO | 54 weight % |
| SiO$_2$ | 35.9 weight % |
| K$_2$O | 10.1 weight % |

This first glass had a softening point of 590° C. and a thermal expansion coefficient of $97 \times 10^{-7}/°C$. The bonding of the core pieces with the first glass was conducted by heating at 700°–760° C.

The magnetic core thus produced had the following structure:

| | |
|---|---|
| Width of the magnetic core | 0.15 mm |
| Track width | 13 μm |
| Gap length | 0.8 μm |
| Gap depth | 5–10 μm |

A slider made of a CaTiO$_3$ ceramic having a thermal expansion coefficient of $108 \times 10^{-7}/°C$. and a porosity of 0.15% was formed with a slit of 1.3 mm in length and 220 μm in width at one end of one side rail thereof. The magnetic core was then provisionally fixed in the slit with a leaf spring. The core was then fixed to the slider with the following second glass:

| | |
|---|---|
| PbO | 78 weight % |
| Al$_2$O$_3$ | 7 weight % |
| SiO$_2$ | 8 weight % |
| B$_2$O$_3$ | 7 weight % |

The second glass had a thermal expansion coefficient of $90 \times 10^{-7}/°C$. and a softening point of 450° C., and it was caused to flow into a gap between the slit and the magnetic core by heating at 540°–560° C. An air-bearing surface of the magnetic head thus produced was ground and then mirror-finished to provide a flying-type composite magnetic head of the present invention. Incidentally, the distances between both sides of the magnetic core and the inner surfaces of the slit were 50 μm and 20 μm, respectively.

Figure 16:
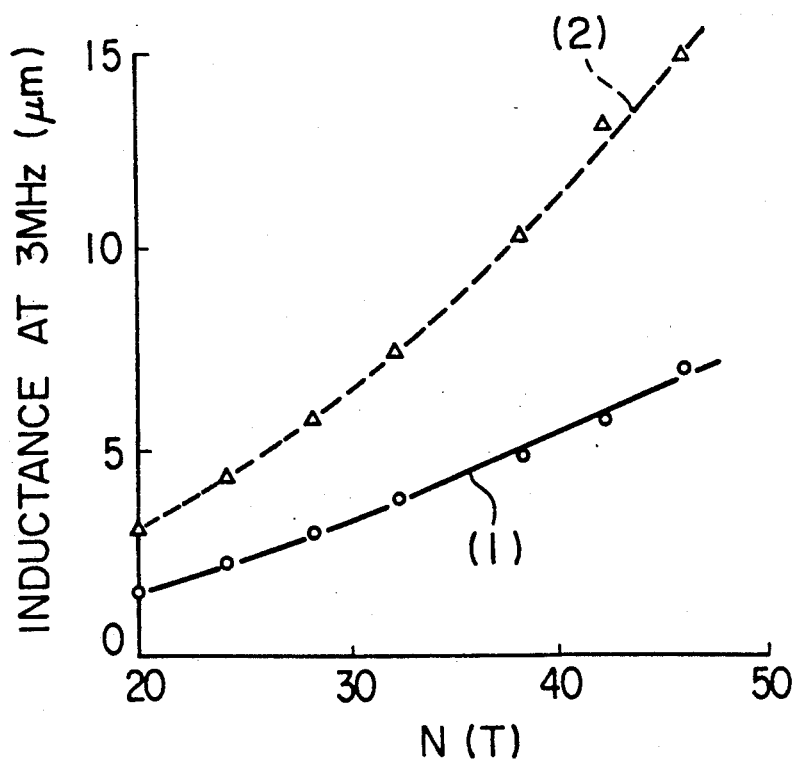
FIG. 16 is a graph showing the relations between inductance and the number of coil winding (N)

The magnetic head thus produced was provided with coil winding, and its inductance was measured. The results are shown in FIG. 16. For comparison, a conventional monolith-type magnetic head was also measured. The monolith-type magnetic head used for comparison had a track width of 18 μm and a gap depth of 20 μm. It is clear from FIG. 16 that the magnetic head designated by line (1) (this Example) showed smaller inductance and was more advantageous in increasing recording and reproducing rate, particularly data transfer rate at high frequency than the conventional monolithic-type magnetic head disignated by line (2).

EXAMPLE 2

In this Example, the conventional magnetic cores shown in FIGS. 7 and 8 in which $\theta=60°$, and magnetic cores of the present invention shown in FIGS. 2 and 3 were produced. Each of these cores was fixed in a CaTiO$_3$ slider, and then each of the resulting magnetic heads was subjected to proper working. Incidentally, with respect to the first glass for bonding magnetic core pieces and the second glass for fixing the magnetic cores in the slits, they were the same as in Example 1.

Each magnetic head had a gap length of 0.8 μm and a track width of 13–15 μm. Recording was conducted with 21 turns of winding, and reproduction was conducted with 42 turns of winding. A Co-Ni sputtered disk having an Hc of 700 Oe was used for measurement, and each measurement was conducted at 3600 rpm, a floating height of 0.3 μm and a measuring position of a disk at a radius of 32 mm. The results are shown in Table 1.

TABLE 1

| | Magnetic Head of Present Invention | | | | Conventional Magnetic Head | | |
|---|---|---|---|---|---|---|---|
| | 1 | 2 | 3 | | 4 | 5 | 6 |
| Thickness of | 10 | 5 | 3 | t$_1$ | 10 | 5 | 3 |

TABLE 1-continued

| | Magnetic Head of Present Invention | | | | Conventional Magnetic Head | | |
|---|---|---|---|---|---|---|---|
| | 1 | 2 | 3 | | 4 | 5 | 6 |
| Thin Layer (μm) | | | | $t_2$ | 19 | 17 | 15 |
| Reproduced Output (mV) | 0.51 | 0.49 | 0.52 | | 0.38 | 0.42 | 0.40 |
| Peeling off of Crystal Particles | No | No | No | | Much | Much | Yes |

As is clear from Table 1, the magnetic heads of the present invention show higher reproduced output as compared with the conventional ones. As a result of extensive research on this reason by the inventors, it has been found that reproduced output it is greatly affected by stress caused due to the difference in a thermal expansion coefficient.

Figure 9:
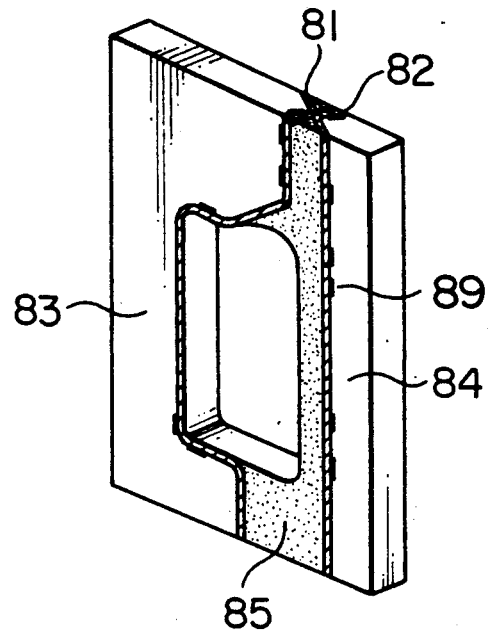
FIG. 9 is a perspective view schematically showing the magnetic core of FIG. 7 in which crystal particles of the core pieces peel off.

It is difficult to measure the stress itself exerted onto the Fe-Al-Si thin layer because of the complicated shapes of the magnetic core of the present invention and of the conventional. However, it may be presumed from how many crystal particles of the Mn-Zn ferrite core peeled off. FIG. 9 schematically shows the peeling state of the crystal particles of the Mn-Zn ferrite which was observed after bonding of the conventional magnetic core and then cutting it. Black portions 89 existing along the boundaries between the core pieces 83, 84 and the Fe-Al-Si thin layers 81, 82 indicate the peeled crystal particles, and it is clear that in this sample extreme stress is applied. On the other hand, in this Example of the present invention, the Mn-Zn ferrite core had a thermal expansion coefficient of $115 \times 10^{-7}/°C$. while the Fe-Al-Si thin layer had a thermal expansion coefficient of $156 \times 10^{-7}/°C$. or so. Thus, in the case of bonding these core pieces with glass, peeling of crystal particles of the Mn-Zn ferrite could not be prevented only by selecting glass with a proper thermal expansion coefficient and a proper bonding temperature.

Accordingly, to achieve high reproduced output, it is necessary to reduce a stress exerted to the Fe-Al-Si thin layer. For this purpose, the Fe-Al-Si thin layer should be as thin as possible. As is clear from Table 1, the thickness of the Fe-Al-Si thin layer is desirably 10 μm or less. In the present invention, since the gap structure is in a trapezoidal shape, the thickness of the Fe-Al-Si layer can be determined independently of the track width. However, in the conventional magnetic cores of FIG. 8 the track width is not in an independent relation with the layer thickness. Particularly, a thickness $t_2$ is inevitably large, causing the deterioration of the magnetic properties of the Fe-Al-Si thin layer and the Mn-Zn ferrite due to stress. Thus, high reproduced output cannot be expected.

EXAMPLE 3

Figure 10:
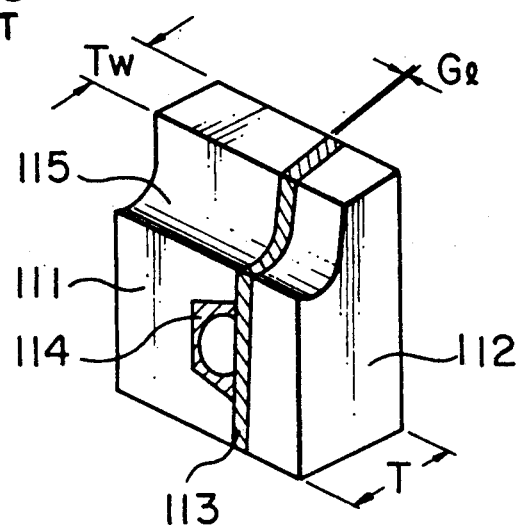
FIG. 10 is a perspective view showing a magnetic core for achieving various combinations of a track width Tw and a gap length Gl.

FIG. 10 shows the structure of a magnetic core in which a track width Tw and a thickness of an Fe-Al-Si thin layer can be changed independently. Reference numeral 111 and 112 respectively denote a C-shaped core piece and an I-shaped core piece both made of Mn-Zn ferrite, 113 denotes the Fe-Al-Si thin layer, 114 denotes a bonding glass; and Ge denotes gap length. The track width Tw of such a magnetic core can be obtained by providing a notch 115 to a part of the core after bonding. Thus, the track width and the thickness of the thin layer are independent of each other. However, as is clear from FIG. 10, the a first glass 114 bonding both core pieces 111, 112 exists only in a coil-winding window shown by hatching in the figure. On the other hand, in the magnetic core of the present invention, a much larger amount of glass is used for bonding.

Figure 17:
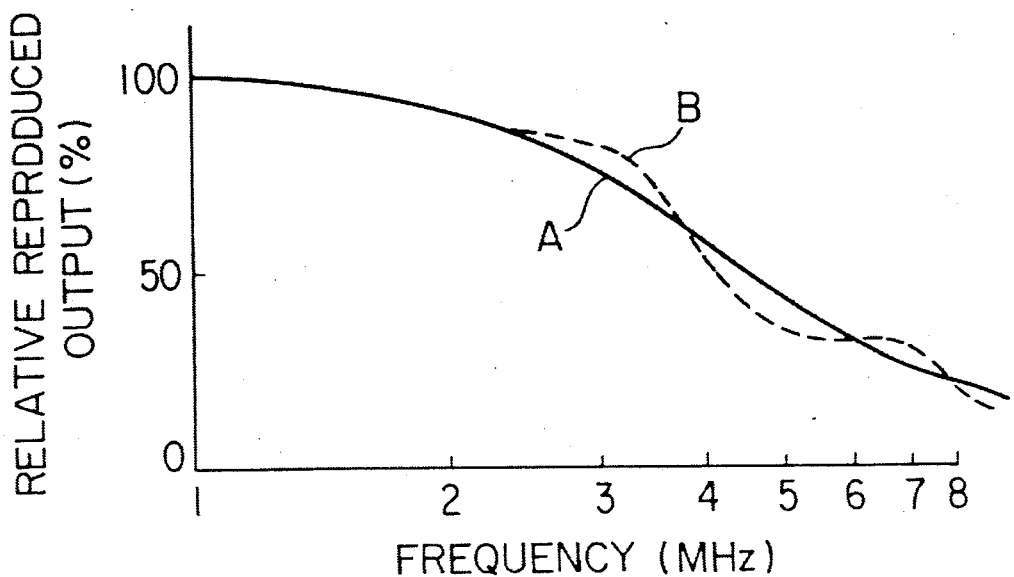
FIG. 17 is a graph showing the relations between relative reproduced output and frequency.

Each of these magnetic cores was fixed in the slider in the same manner as in Example 2, and the characteristics of each magnetic head was measured similarly as in Example 2. The results are shown in FIG. 17, in which solid line A indicates the data of the present invention and dash line B indicates a conventional magnetic head for comparative example. In the conventional magnetic head, the undulation of reproduced output was observed, while in the magnetic head of the present invention such phenomenon did not take place. The reason therefor is that the magnetic core of the present invention is bonded with the first glass in much wider portions.

Figure 18A:
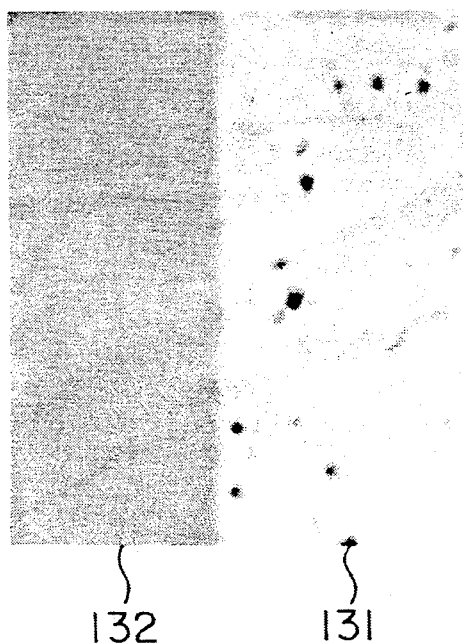
FIGS. 18(a) and (b) are photomicrographs ($\times 40,000$) by scanning electron microscope (SEM) showing the peeling state of an Fe-Al-Si thin layer at the boundary between the Fe-Al-Si thin layer and the Mn-Zn ferrite core in each magnetic core, in which (a) shows the magnetic core of the present invention and (b) shows the conventional magnetic core.
Figure 18B:
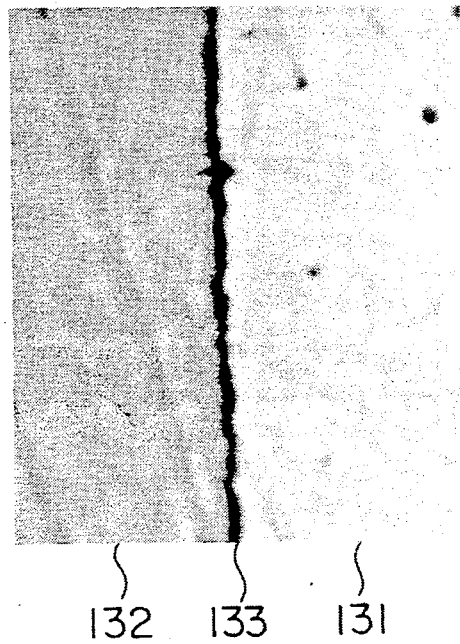

FIGS. 18(a) and (b) show SEM photomicrographs (×40,000) of a boundary between an Mn-Zn ferrite and an Fe-Al-Si thin layer of each magnetic head in its surface opposing to a recording medium. In the conventional magnetic head shown in FIG. 18(b), a slight gap 133 of 200–300 Å or so is observed in the boundary between the Mn-Zn ferrite 131 and the Fe-Al-Si thin layer 132. On the other hand such a gap is not observed in the magnetic head of the present invention as shown in FIG. 18(a). Such a small gap substantially causes magnetic discontinuity at the junction of the Fe-Al-Si thin layer and the Mn-Zn ferrite, which in turn causes the undulation phenomenon.

EXAMPLE 4

In the production of a magnetic head, it is important to choose proper glass compositions. In this Example, various glass compositions were used. With various $SiO_2$ contents, glass bonding was conducted. The results are shown in Table 2 below. It is clear from Table 2 that if the $SiO_2$ content is properly selected, a reaction with an Fe-Al-Si thin layer may take place, and the resulting glass has so high a softening point that glass bonding cannot be easily conducted.

TABLE 2

| Sample No. | Glass Composition (weight %) | | | Softening Temp. (°C.) | Bonding Temp (°C.) | Bonding Conditions |
|---|---|---|---|---|---|---|
| | PbO | $SiO_2$ | $K_2O$ | | | |
| 1 | 60.3 | 25.2 | 14.5 | 580 | 695 | Corrosion of Fe-Al-Si Layer |
| 2 | 59.3 | 28.0 | 12.7 | 571 | 700 | Good |
| 3 | 54.0 | 35.9 | 10.1 | 590 | 720 | Good |
| 4 | 44.0 | 49.0 | 7.0 | 620 | 760 | Good |
| 5 | 38.5 | 52.5 | 9.0 | 680 | 840 | Peeling without Bonding |

Thus, when $SiO_2$ is smaller than 28.0 weight %, the bonding glass corrodes the Fe-Al-Si thin layer, resulting in extreme deterioration of magnetic properties of the Fe-Al-Si thin layer. And when $SiO_2$ exceeds 49.0 weight %, the glass has so high a softening point that the glass bonding cannot be conducted, whereby the C-shaped core piece and the I-shaped core piece are detached from each other.

EXAMPLE 5

Figure 19:
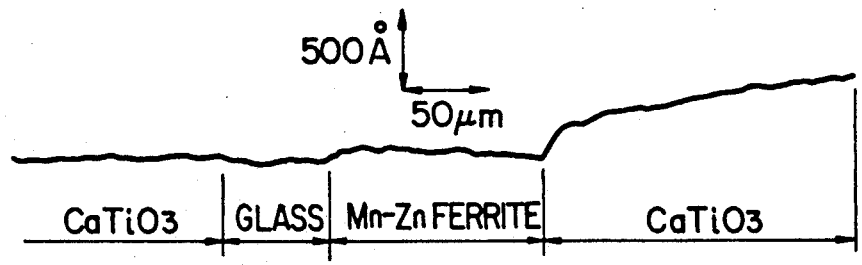
FIG. 19 is a graph showing the flatness of the air-bearing surface along the line X-Y of the flying-type composite magnetic head shown in FIG. 11.

With respect to a magnetic head of the structure shown in FIG. 11, flatness along the line X-Y was measured by a needle contact-type surface roughness tester (Talystep, manufactured by Rank Taylor Hobson). The measured result is shown in FIG. 19. As is clear from this result, the flatness of the air-bearing surface is good from CaTiO₃→Bonding glass→Mn-Zn ferrite (i.e., from left to right in FIG. 19) of the figure is good. However, at the boundary of the Mn-Zn ferrite and CaTiO₃, the flatness is drastically lowered.

Figure 20:
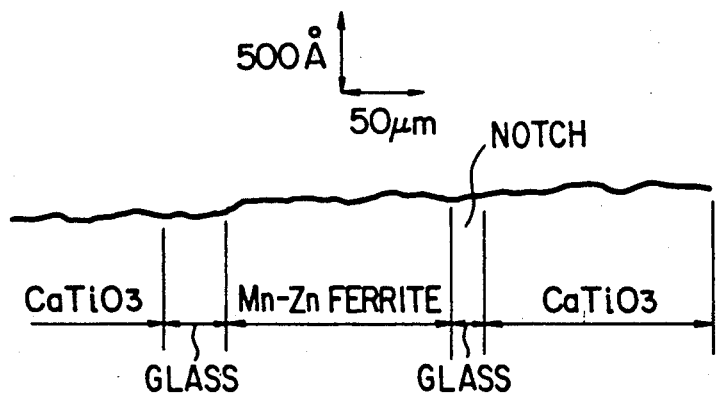
FIG. 20 is a graph showing the flatness of the air-bearing surface along the line X-Y of the flying-type composite magnetic head shown in FIG. 13.

Similarly, a magnetic head of the present invention shown in FIG. 13 was measured with respect to flatness. Its notch width was 20 μm. The measured result is shown in FIG. 20. As is clear from the comparison between FIGS. 19 and 20, the structure of the magnetic head according to the present invention serves to extremely improve the flatness.

Figure 21:
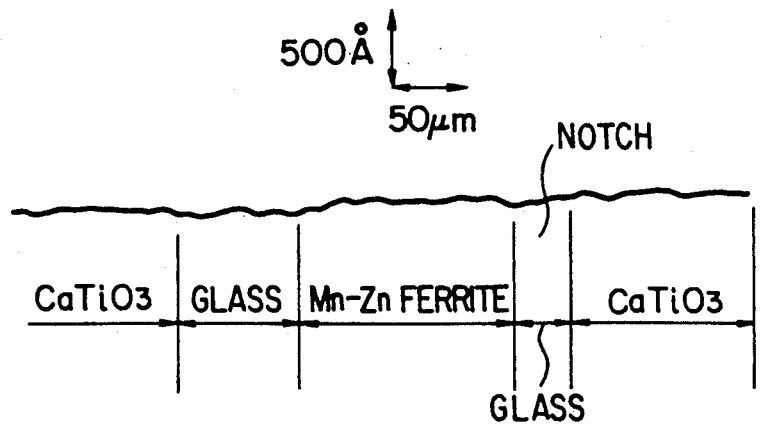
FIG. 21 is a graph showing the flatness of the air-bearing surface along the line X-Y of the flying-type composite magnetic head shown in FIG. 14.

With respect to a magnetic head of the structure shown in FIG. 14 (a notch width in the air-bearing surface was 40 μm), its flatness was similarly tested. The measured result is shown in FIG. 21.

Figure 22:
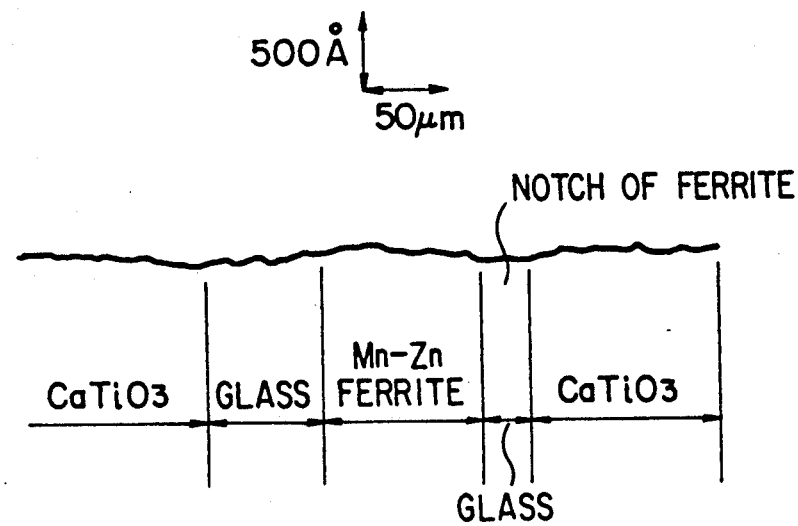
FIG. 22 is a graph showing the flatness of the air-bearing surface along the line X-Y of the flying-type composite magnetic head shown in FIG. 15.

Further, with respect to a magnetic head of the structure shown in FIG. 15 (a notch width: 35 μm), flatness was similarly tested. The measured result is shown in FIG. 22.

Those structures for a magnetic head according to the invention shown in FIGS. 14 and 15 are also improved in the flatness of the air-bearing surfaces.

EXAMPLE 6

Figure 23:
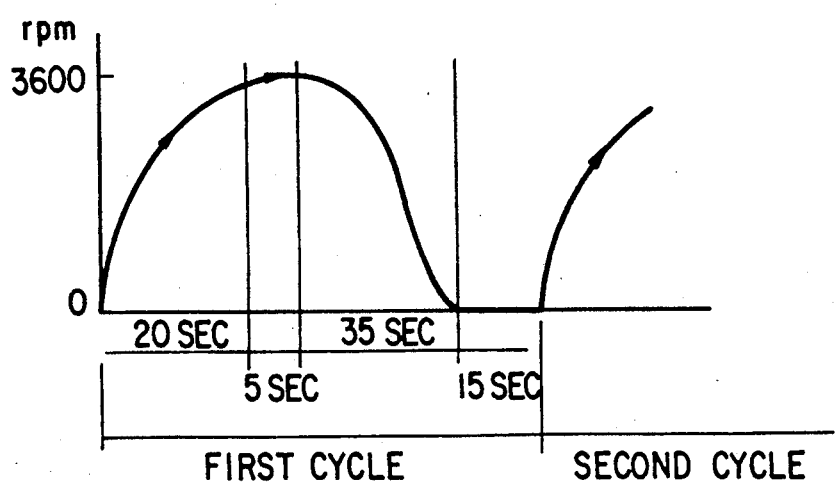
FIG. 23 is a view showing a cycle of a CSS test.

This Example shows that a magnetic head with good flatness can provide good CSS characteristics. For measurement of CSS characteristics, a 5.25-inch Co-Ni sputtered magnetic disk was used. Since a magnetic layer made of sputtered Co-Ni itself does not have good CSS characteristics, its surface was coated with a carbon sputtered layer having a thickness of about 300 Å. FIG. 23 shows a CSS cycle, in which a magnetic head started to float by the initiation of the rotation of the magnetic disk, and the floating height of the magnetic head from the disk was controlled to be 0.3 μm at 3600 rpm. By the stop of rotation of the magnetic disk, the magnetic head descended and was in contact with the magnetic disk for about 15 secs. This cycle, called a "CSS cycle," was repeated.

As magnetic heads, the conventional one shown in FIG. 11 and those of the present invention shown in FIGS. 13, 14 and 15 were used. The results after 30,000 CSS cycles are shown in Table 3.

TABLE 3

| CSS Cycle | | Sample No. | | | |
|---|---|---|---|---|---|
| | | 1 (FIG. 11) | 2 (FIG. 13) | 3 (FIG. 14) | 4 (FIG. 15) |
| 1 Cycle | Sticking | No | No | No | No |
| | Friction Coefficient | 0.37 | 0.35 | 0.34 | 0.35 |
| 7,200 Cycles | Sticking | Yes | No | No | No |
| | Friction Coefficient | 0.95 | 0.37 | 0.35 | 0.38 |
| 30,000 Cycles | Sticking | Yes | No | No | No |
| | Friction Coefficient | — | 0.39 | 0.39 | 0.40 |

Note:
Sample No.1: Conventional magnetic core
Sample Nos. 2-4: Magnetic cores of the present invention In the conventional magnetic head, at the time of 7,200 CSS cycles, sticking took place between the magnetic head and the magnetic disk, increasing the friction coefficient to as high as 0.95. Accordingly, the magnetic disk could not be rotated further, and the test was terminated. On the other hand, in the three magnetic heads of the present invention, such phenomenon never took place. Even after 30,000 CSS cycles, their surface conditions were not substantially changed from their initial ones. By observation of the conventional magnetic head which suffered from sticking, it was found that a portion of the carbon layer had stuck to the magnetic head in a region starting from the boundary of the Mn-Zn ferrite and CaTiO₃ slider. Thus, this caused the causing extreme sticking.

As explained above in detail by means of the Examples, the magnetic head according to the present invention shows low inductance as a magnetic head for magnetic disks, and also shows excellent recording-reproduction characteristics (low reproduction undulation) and CSS characteristics.

Incidentally, in the Examples, the Fe-Al-Si thin layer was coated only on the I-shaped core piece. It should be noted that the other core piece, namely the C-shaped core piece, may also be coated with an Fe-Al-Si thin layer for the same purpose. Further, only by properly changing a glass composition, a bonding temperature, etc., magnetic heads with similarly good characteristics can be obtained.

The flying-type composite magnetic head of the present invention has a structure in which one of side rails of the slider has a slit which fixedly supports a magnetic core with glass layers having sufficient thickness from both sides, so that its air-bearing surface has good flatness, thereby preventing the undulation of reproduced output.

What is claimed is:

1. A flying-type composite magnetic head comprising: a slider made of a non-magnetic ceramic and having side rails extending longitudinally on both lateral sides of said head; a slit extending longitudinally in one of said side rails; and a magnetic core constituted by a pair of core pieces bonded to each other with a first glass and fixed in said slit with a second glass, wherein
    (a) at least one opposing surfaces of said core pieces is formed with an Fe-Al-Si thin layer;
    (b) said opposing surfaces constitute a magnetic gap of said magnetic core;
    (c) said magnetic core and said slit are shaped such that there are sufficient gaps between said magnetic core and both inner surfaces of said slit at least in a region exposed to an air-bearing surface of said magnetic head, and that said magnetic core is in contact with one of the inner surfaces of said slit in a region distant from said air-bearing surface; and
    (d) said gaps on both sides of said magnetic core in a region exposed to said air bearing surface are filled with said second glass, whereby said air-bearing surface including said magnetic core has improved flatness.

2. The flying-type composite magnetic head according to claim 1, wherein said slider is made of CaTiO₃.

3. The flying-type composite magnetic head according to claim 1, wherein said Fe-Al-Si thin layer has a thickness of 10 μm or less.

4. The flying-type composite magnetic head according to claim 1, wherein said core pieces of said magnetic core are made of Mn-Zn ferrite.

5. The flying-type composite magnetic core according to claim 1, wherein said magnetic core is constituted by a C-shaped core pie core piece, said C-shaped core piece and said I-shaped core piece being bonded to each other with a layer of said first glass filled in spaces defined by said opposing surfaces, and both sides of said magnetic core and said first glass layer being fixed in said slit with a layer of said second glass.

6. The flying-type composite magnetic head according to claim 5, wherein said second glass layer filled between both sides of said magnetic core and the inner surfaces of said slit has a thickness of 5-100 μm.

7. The flying-type composite magnetic head according to claim 5, wherein said first glass layer for bonding said pair of core pie contains 28-49 weight % of $SiO_2$.

8. The flying-type composite magnetic head according to claim 6, wherein said first glass layer for bonding said pair of core pie contains 28-49 weight % of $SiO_2$.

9. The flying-type composite magnetic head according to claim 7, wherein said first glass layer is substantially made of a glass composition comprising 44-59 weight % of PbO, 28-49 weight % of $SiO_2$ and 7-13 weight % of at least one alkali metal oxide.

10. The flying-type composite magnetic head according to claim 7, wherein said first glass layer is substantially made of a glass composition comprising 28-49 weight % of $SiO_2$, 5-15 weight % of $B_2O_3$, 7-13 weight % of at least one alkali metal oxide and balance substantially PbO.

11. The flying-type composite magnetic head according to claim 7, wherein said first glass layer is substantially made of a glass comprising 28-49 weight % of $SiO_2$, 5-10 weight of $B_2O_3$, 5-12 weight % of $Al_2O_3$, 7-13 weight % of at least one alkali metal oxide and the balance substantial PbO.

12. The flying-type composite magnetic head according to claim 5, wherein said second glass layer for fixing said magnetic head in said slit has a thermal expansion coefficient of $87-96 \times 10^{-7}/°C$. and a softening point of 370°-480° C., and said slider is made of $CaTiO_3$ having a thermal expansion coefficient of $105-115 \times 10^{-7}/°C$.

13. The flying-type composite magnetic head according to claim 12, wherein said second glass layer is substantially made of a glass composition comprising 70-83 weight % of PbO, 3-10 weight % of $Al_2O_3$, 6-13 weight % of $SiO_2$ and 4-10 weight % of $B_2O_3$.

14. The flying type composite magnetic head according to claim 2, wherein said core pieces of said magnetic core are made of Mn-Zn ferrite.

15. The flying type composite magnetic head according to claim 3, wherein said core pieces of said magnetic core are made of Mn-Zn ferrite.

16. The flying-type composite magnetic head according to claim 6, wherein said second glass layer for fixing said magnetic head in said slit has a thermal expansion coefficient of $87-96 \times 10^{-7}/°C$. and a softening point of 370°-480° C., and said slider is made of $CaTiO_3$ having a thermal expansion coefficient of $105-115 \times 10^{-7}/°C$.

17. The flying-type composite magnetic head according to claim 7, wherein said second glass layer for fixing said magnetic head in said slit has a thermal expansion coefficient of $87-96 \times 100^{-7}/°C$. and a softening point of 370°-480° C., and said slider is made of $CaTiO_3$ having a thermal expansion coefficient of $105-115 \times 10^{-7}/°C$.

18. The flying-type composite magnetic head according to claim 8, wherein said second glass layer for fixing said magnetic head in said slit has a thermal expansion coefficient of $87-96 \times 10^{-7}/°C$. and a softening point of 370°-480° C., and said slider is made of $CaTiO_3$ having a thermal expansion coefficient of $105-115 \times 10^{-7}/°C$.

19. The flying-type composite magnetic head according to claim 9, wherein said second glass layer for fixing said magnetic head in said slit has a thermal expansion coefficient of $87-96 \times 10^{-7}/°C$. and a softening point of 370°-480° C., and said slider is made of $CaTiO_3$ having a thermal expansion coefficient of $105-115 \times 10^{-7}/°C$.

20. The flying-type composite magnetic head according to claim 10, wherein said second glass layer for fixing said magnetic head in said slit has a thermal expansion coefficient of $87-96 \times 10^{-7}/°C$. and a softening point of 370°-480° C., and said slider is made of $CaTiO_3$ having a thermal expansion coefficient of $105-115 \times 10^{-7}/°C$.

21. The flying-type composite magnetic head according to claim 11, wherein said second glass layer for fixing said magnetic head in said slit has a thermal expansion coefficient of $87-96 \times 10^{-7}/°C$. and a softening point of 370°-480° C., and said slider is made of $CaTiO_3$ having a thermal expansion coefficient of $105-115 \times 10^{-7}/°C$.

22. The flying-type composite magnetic head according to claim 1, wherein one of the inner surfaces of said slit is receding in a region exposed to said air-bearing surface for defining a gap between said magnetic core and the receding inner surface in addition to a gap on the other side of said magnetic core, said gaps being said second glass.

23. The flying-type composite magnetic head according to claim 1, where of the inner surfaces of said slit is inclined outwardly in a region exposed surface for defining a gap between said magnetic core and the inclined inner surface of said slit in addition to a gap on the other side of said magnetic being filled with said second glass.

24. The flying-type composite magnetic head according to claim 1, where side surface of said magnetic head is receding in a region exposed to said surface for defining a gap between the receding surface of said magnetic core surface of said slit in addition to a gap on the other side of said magnetic being filled with said second glass.

* * * * *

UNITED STATES PATENT AND TRADEMARK OFFICE
CERTIFICATE OF CORRECTION

PATENT NO. : 5,008,767

DATED : April 16, 1991

INVENTOR(S) : Iwata et al.

It is certified that error appears in the above-identified patent and that said Letters Patent is hereby corrected as shown below:

Col. 1, line 19, "gap" should be --gap,--.

Col. 2, line 67, "layer" should be --layer;--.

Col. 3, line 5, "rotating" should be --rotating,--;
line 35, "tis" should be --its--;
line 37, "extend" should be --extent--;
line 43, "(3) high" should be --(3) has high--;
line 44, "is CSS" should be --in CSS--.

Col. 4, line 52, "Gl" should be --Gℓ--.

UNITED STATES PATENT AND TRADEMARK OFFICE
CERTIFICATE OF CORRECTION

PATENT NO. : 5,008,767

DATED : April 16, 1991

INVENTOR(S) : Iwata et al.

Page 2 of 4

It is certified that error appears in the above-identified patent and that said Letters Patent is hereby corrected as shown below:

Col. 5, line 63, "Gl" should be --G$\ell$--;
line 66, "Gl" should be --G$\ell$--;
line 67, "Gl" should be --G$\ell$--.

Col. 8, line 1, "by" should be deleted;

Col. 9, line 14, "bonding a first" should be --a first bonding--;

Col. 11, line 43, "it" should be deleted;

Col. 13, line 15, "it" should be deleted;
line 21, "conventional," should be --conventional one.--;
line 59, "numeral" should be --numerals--;
line 62, "Ge" should be --G$\ell$--;
line 67, "a" should be deleted.

Col. 14, line 9, "dash" should be --dashed--;
line 24, "hand" should be --hand,--.

UNITED STATES PATENT AND TRADEMARK OFFICE
CERTIFICATE OF CORRECTION

PATENT NO. : 5,008,767

DATED : April 16, 1991

INVENTOR(S) : Iwata et al.

It is certified that error appears in the above-identified patent and that said Letters Patent is hereby corrected as shown below:

Col. 15, line 3, "19) of the figure is good." should be --19).--.

Col. 16, line 6, "causing" should be deleted;
line 65, "pie" should be --piece and an I-shaped--.

Col. 17, line 9, "pie" should be --pieces--;
line 12, "pie" should be --pieces--;
line 29, "7-$_{13}$" should be --7-13--.

Col. 18, line 38, "surface in" should be --surface of said slit in--;
line 39, "being said" should be --being filled with said--;
line 42, "where" should be --wherein one--;
line 43, "exposed surface" should be --exposed to said air-bearing surface--;
line 46, "magnetic being" should be --magnetic core, said gaps being--;

UNITED STATES PATENT AND TRADEMARK OFFICE
CERTIFICATE OF CORRECTION

PATENT NO. :   5,008,767
DATED     :   April 16, 1991
INVENTOR(S) :   Iwata et al.

It is certified that error appears in the above-identified patent and that said Letters Patent is hereby corrected as shown below:

line 49, "where" should be --wherein one--;

line 50, "said surface" should be --said air-bearing surface--;

line 52, "core surface" should be --core and an inner surface--;

line 53, "magnetic being" should be --magnetic core, said gaps being--.

Signed and Sealed this

Twelfth Day of January, 1993

*Attest:*

DOUGLAS B. COMER

*Attesting Officer*   *Acting Commissioner of Patents and Trademarks*